(12) United States Patent
Gunzel et al.

(10) Patent No.: US 12,547,192 B2
(45) Date of Patent: Feb. 10, 2026

(54) MECHANICAL PRESSURE REGULATOR FOR CRYOGENIC FLUIDS

(71) Applicant: NEXANS, Courbevoie (FR)

(72) Inventors: Gerald Gunzel, Vechelde (DE); Ralf Egerer, Hannover (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 18/632,250

(22) Filed: Apr. 10, 2024

(65) Prior Publication Data

US 2024/0377847 A1 Nov. 14, 2024

(30) Foreign Application Priority Data

Apr. 11, 2023 (EP) ...................................... 23305538

(51) Int. Cl.
*G05D 16/06* (2006.01)
(52) U.S. Cl.
CPC ................................ *G05D 16/0655* (2013.01)
(58) Field of Classification Search
CPC . F16L 59/065; F16L 59/075; Y10T 137/7043; Y10T 137/7062; F16K 51/02; G05D 16/0655
See application file for complete search history.

(56) References Cited

U.S. PATENT DOCUMENTS

| | | | |
|---|---|---|---|
| 3,674,169 A * | 7/1972 | Miller | F16K 27/006 220/8 |
| H594 H | 3/1989 | Adorjan | |
| 4,903,719 A * | 2/1990 | Rains | F16K 27/12 137/382.5 |
| 11,892,382 B2 * | 2/2024 | Tsao | G08B 3/10 |
| 2005/0145012 A1 * | 7/2005 | Im | G01M 3/223 73/31.03 |
| 2009/0032115 A1 | 2/2009 | Ohmi et al. | |

FOREIGN PATENT DOCUMENTS

CN 212131432 U * 12/2020

OTHER PUBLICATIONS

European Search Report dated Sep. 1, 2023.

\* cited by examiner

*Primary Examiner* — Jessica Cahill
(74) *Attorney, Agent, or Firm* — MUNCY, GEISSLER, OLDS & LOWE, P.C.

(57) ABSTRACT

A pressure regulator for fluids is described. The pressure regulator (100) has a main body (108) including a control valve (112,113) actuated by a control element (119) responding to a pressure signal generated by sensor means (118) to maintain a set pressure in the transfer line. The main body (108), the control valve (112,113), the control element (119) and the sensor means (118) are contained in an interior space (124) enclosed by a housing (123). A pressure below atmospheric pressure prevails in the interior space (124).

7 Claims, 1 Drawing Sheet

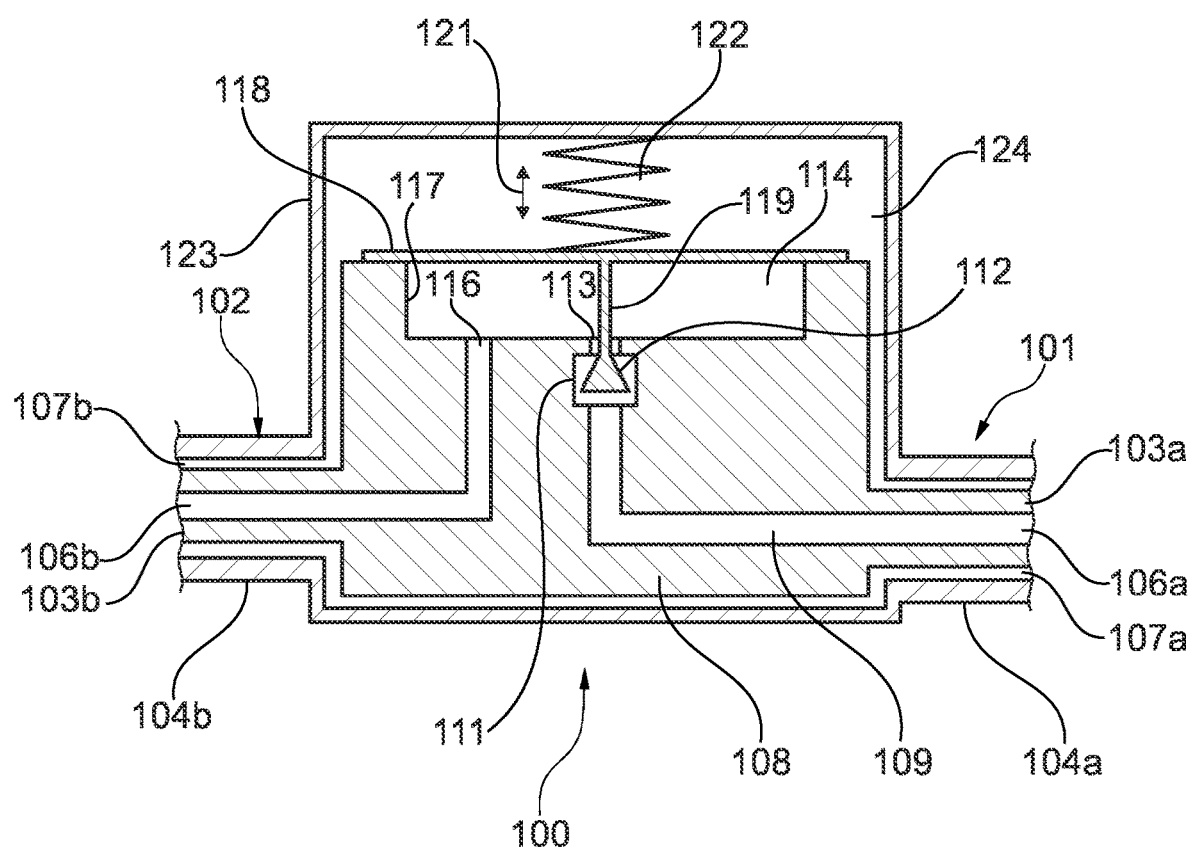

MECHANICAL PRESSURE REGULATOR FOR CRYOGENIC FLUIDS

RELATED APPLICATION

This application claims the benefit of European Patent Application No. 23 305 538.3, filed Apr. 11, 2023, the entirety of which is incorporated by reference.

FIELD

The present disclosure relates to a pressure regulator for fluids.

BACKGROUND

Transfer systems in many scales for a nearly uncountable number of fluids are essential parts of the global supply chain infrastructure. For instance, in the context of global efforts for reducing carbon dioxide emissions spurred the interest in alternative energy sources such as liquefied natural gas (LNG) and liquefied hydrogen (LH2) because these energy sources may contribute to a decrease of carbon dioxide emissions and to slow down or even stop the global climate change. LNG and LH2 are transferred in liquid state as cryogenic fluid at very low temperatures such as 110 K for LNG and 20 K for LH2. The transfer systems consist of many modules and components like flexible transfer lines, pipes, couplings, tanks, valves, pressure regulators, etc. They are used to transfer various liquid or gaseous substances between a static storage tank and a mobile receiving tank in most cases. Typical applications include but are not limited to tanker loading, fuel bunkering for cargo ships as well as loading/unloading of rail tanks and tank cars.

Many charged substances, not just the LNG and LH2 mentioned above, must be kept at a certain temperature throughout the supply chain to maintain their properties, e.g. to keep them in liquid state as it is the case. One important issue of transferring cryogenic fluids is to keep them cold as even small amount of heat might cause boil-off losses. Additionally, for very cold cryogenic fluids with an operation temperature below the condensation temperature of oxygen like LH2, the atmospheric oxygen condensates on cold spots along the transfer system and increases the risk of inflammation due to an oxygen-rich atmosphere. In a transfer system, not only the temperature must be controlled, but also the system pressure to achieve sufficient transfer capacity without overloading the transfer lines. There are two main options for meeting the latter requirement. The first option is to control the power of the feed pumps to keep the pressure in the transfer lines in a desired range. The second less complicated option is to include a pressure regulator in the transfer line that regulates the pressure inside the transfer line by operating a control valve to keep the pressure in the transfer line in a desired range. However, current pressure regulators are not insulated. If these pressure regulators are used for cryogenic fluids, the devices are covered after installation in the transfer system with insulating material like polymeric foam. Unfortunately, polymeric foam is a poor thermal insulator. If it is utilized in connection with LH2 transferring devices an extremely thick cover is necessary to get a proper thermal insulation. This approach is disadvantageous for at least the following reasons: If the set pressure is to be changed or maintenance, repair, or any other manipulation at the pressure regulator is necessary, the insulating cover made of polymeric foam has to be removed and scrapped. After the work on the pressure regulator is finished, a new foam cover is applied.

Further security related problems regarding a foam cover on the pressure regulator are even more serious. Atmospheric oxygen can get between the foam cover serving as insulation and a cold wall of the pressure regulator during installation and operation. If the cold wall cools down to 20 K for instance, oxygen below the insulation cover condensates and forms a puddle of liquid oxygen because the condensation temperature of oxygen is 90 K. Again, the presence of liquid oxygen may create an oxygen-rich atmosphere that increases the risk of inflammation. Furthermore, the thick foam cover makes it very hard to detect a leak in the pressure regulator and the leaking out of fluid. Finally, it is noted that conventional pressure regulators are single walled devices without providing a second containment. A second containment may be very relevant to protect the environment or operating personnel from damages if environmental hazardous fluids are transferred.

In view of the limitations of existing pressure regulators, there remains a desire for a pressure regulator to overcome or at least improve one or more of the problems mentioned at the outset.

OBJECTS AND SUMMARY

The present disclosure suggests a pressure regulator for fluids. The pressure regulator comprises a main body including a control valve actuated by a control element responding to a pressure signal generated by sensor means to maintain a set pressure in the transfer line. The main body, the control valve, the control element and the sensor means are contained in an interior space enclosed by a housing. A pressure below atmospheric pressure prevails in the interior space.

The components of the pressure regulator other than the housing are entirely enclosed by the housing and are insulated from the environment. Especially, when sensitive fluids are transferred this is an important advantage.

In a preferred embodiment the transfer line is a multiwalled transfer line. The housing is connected with an outer tube of the multiwalled transfer line such that a ring space enclosed between the outer tube and an inner tube of the multiwalled transfer line is fluidly connected with the interior space.

This embodiment has the advantage the pressure regulator is insulated from the environment in the same way as the transfer line.

With advantage the interior space and the ring space are evacuated. In the context of the present disclosure the term "evacuated" relates to a vacuum with a pressure in a range between 1 to $10^{-7}$ hPa. However, the present disclosure is not limited to such pressures.

The present pressure regulator is a mechanical pressure regulator with a second wall forming a vacuum-space enclosing the entire device. I.e. no signal or power lines let alone mechanical connections pass the insulation, which assures a higher level of thermal insulation compared with conventional pressure regulators. Even more, the vacuum-insulation is the best possible thermal insulation. No gas from the surrounding atmosphere, e.g. oxygen, can get trapped between the insulation and a cold wall of the pressure regulator. Double wall design forms a second containment.

The pressure regulator's outlet pressure is completely independent from the atmospheric pressure. The pressure regulator's pressure reference is constant e.g. vacuum (absolute pressure based). The pressure regulator enables pressure regulation of sub-atmospheric pressures.

In another embodiment the thermally insulated pressure regulator is enclosed in a gas-tight envelope whose interior is filled with a gas whose boiling point is below the fluid temperature. The pressure inside the envelope is kept constant. In this embodiment the temperature inside the inner tubes is kept constant, namely at the boiling temperature of gas with which the envelope is filled up.

The field of application of the suggested pressure regulator is in every industry and application where pressure has to be controlled. The proposed pressure regulator is particularly advantageous when the pressure of cryogenic fluids like LH2, LNG, LN2, LOx, LHe, GHe, whose temperature shall not increase above a certain level needs to be regulated.

Likewise, the pressure regulator is applicable for pressure regulation of hot fluids whose temperature shall not decrease under a certain level.

Furthermore, pressure regulation of hazardous fluids which need double walled vessels for safety and risk reasons is another field of application of the pressure regulator according to the present disclosure.

Advantageously, the pressure regulator is installed between an upstream section and a downstream section of the transfer line.

The pressure regulator effectively controls the pressure in the downstream section of the transfer line to maintain a desired transfer capacity without overloading the transfer line.

In a further embodiment the sensor means is a membrane.

The membrane is apt for separating a fluid carrying part of the pressure regulator from the interior space of the pressure regulator that is kept at a reference pressure. In case of vacuum insulated transfer lines, the interior space is evacuated, and the reference pressure is vacuum enabling the pressure regulator to control pressures below atmospheric pressures.

In this case it has been found useful when the sensor means further comprise the spring exerting a spring force on the membrane, wherein the spring is contained in the housing of the pressure regulator.

The spring allows for design flexibility regarding the set pressure that is maintained by the pressure regulator. The membrane material can be adapted to the fluid that is transferred through the pressure regulator while the mechanical properties determining the responsiveness of the sensor means are defined by selecting an appropriate spring force exerted on the membrane.

In a further development the pressure regulator is provided with a pressure means, in particular a spindle, which enables a preload of the spring to exert adjustable forces on the spring so that different set pressures of the pressure regulator can be selected.

This version of the pressure regulator is flexible regarding the set pressure.

BRIEF DESCRIPTION OF THE DRAWINGS

Exemplary embodiments of the present disclosure are illustrated in the drawings and are explained in more detail in the following description. In the Figures, the same or similar elements are referenced with the same or similar reference signs.

FIG. 1 shows a schematic cross-section of a pressure regulator according to the present disclosure.

DETAILED DESCRIPTION

FIG. 1 shows a mechanical pressure regulator 100 according to the present disclosure. The pressure regulator 100 is installed between an upstream section 101 and a downstream section 102 in a double-walled transfer line. The upstream section 101 of the transfer line comprises an inner tube 103a and an outer tube 104a. Likewise, the downstream section 102 of the transfer line comprises an inner tube 103b and an outer tube 104b. The inner tubes 103a,b enclose channels 106a,b, respectively, through which a fluid is transferred.

In the context of the present disclosure the term "fluid" is a placeholder for any kind of flowable materials that can have a solid, liquid or gaseous state of aggregation. In the following any kind of flowable material irrespective of its state of aggregation will be referred to as fluid including solid powders that can be pumped and flow through transfer lines like a liquid. Fluids in this sense also include aerosols and emulsions.

Ring spaces 107a,b between the inner and outer tubes 103a,b and 104a,b are evacuated to achieve vacuum insulation of the inner tubes 103a,b. In some embodiments the ring spaces 107a,b accommodate spacers and a superinsulation layer not shown in FIG. 1. The spacers inhibit the inner tubes 103a,b to get into direct contact with the outer tubes 104a,b. The superinsulation layer prevents radiation from entering into the inner tubes 103a,b. Both measures aim at limiting the heating up of fluid flowing inside the inner tubes 103a,b.

The upstream and downstream inner tubes 103a,b are connected with a main body 108 of the pressure regulator 100 in a fluid tight manner, for instance by welding. The channel 106a of the upstream inner tube 103a continues as a passage 109 in the main body 108. The passage 109 leads to a valve chamber 111 accommodating a valve element 112 that controls the size of a free passage of an outlet 113 of the valve chamber 111. The outlet 113 enters into a communication chamber 114 that is linked with a passage 116 which is fluidly connected with the channel 106b of the downstream inner tube 103b. Thus, the passages 109, 116, the outlet 113, and the communication chamber 114 establish a fluid connection between the channels 106a of the upstream inner tube 103a and the downstream inner tube 103b.

The communication chamber 114 is formed as a recess 117 in the main body 108. The recess 117 is closed by a membrane 118 in a fluid tight fashion. An inner side of the membrane 118 is connected with one end of an actuation rod 119. An opposite end of the actuation rod 119 is attached to the valve element 112. As a result, when the membrane 118 moves away from or towards to the main body 108 in response to an increasing and decreasing pressure inside the communication chamber 114, the valve element 112 moves in the same direction. The movement of the membrane 118 and the valve element 112 is indicated by double arrow 121 in FIG. 1. When the membrane 118 moves away from the main body 108, the valve element 112 decreases the size of the free passage of the outlet 113. As a result, the pressure in the communication chamber 114 decreases because the flow of fluid from the upstream inner tube 103a to the downstream inner tube 103b is reduced. When the pressure in the communication chamber 114 decreases the membrane 118 moves back towards the main body 108, which entails a corresponding movement of the valve element 112 to increase the free passage of the outlet 113 again. In consequence, the flow of fluid from the upstream inner tube 103a to the downstream inner tube 103b is increased and the pressure in the communication chamber 114 rises. In a stable situation a predetermined set pressure is achieved inside the downstream channel 106. The cooperation between the valve element 112 and the outlet 113 realizes the control valve controlling the pressure in the downstream transfer line.

The responsiveness of the membrane 118 to the pressure inside the communication chamber 114 is determined by the mechanical properties of the membrane and by a spring 122 that exerts a spring force on to the membrane 118. The design of the membrane 118 and the spring 122 determine a set pressure which is continuously controlled by the pressure regulator 100. In an embodiment the tension of the spring is adjustable by a spindle or the like. The spring 122, for instance a pressure spring 122, rests on an inner wall of a housing 123 of the pressure regulator 100. The housing 123 is connected in a vacuum tight manner on the one side with the upstream outer tube 104a and on the other side with the downstream outer tube 104b. The interior space 124 of the housing 123 is fluidly communicating with the ring spaces 107a,b of the upstream and downstream sections 101,102 of the transfer line. Thus, when the ring spaces 107a,b are evacuated, the interior space 124 is likewise evacuated and a vacuum insulation of the pressure regulator 100 is established. A minor thermal leak created by the mechanical contact between the spring 122 and the housing 123 can be minimized by design and proper choice of material. For instance, a layer of insulating material (not shown in FIG. 1) between the housing 123 and the spring 122 reduces the thermal conductivity between the cold part of the pressure regulator 100 and the housing 123.

When the interior space 124 of the pressure regulator 100 is evacuated, the reference pressure against which the set pressure is regulated is vacuum. Vacuum as a reference pressure enables the pressure regulator 100 to control set pressures below atmospheric pressure. For some fluids this can be an advantage.

In one embodiment the interior space 124 and the ring spaces 107a,b are filled with a gas whose boiling point is below the fluid temperature. In this embodiment the temperature of the fluid inside the inner tubes 103a,b is constant, namely at the boiling temperature of the gas.

Even though the pressure regulator 100 has been described in connection with a double-walled transfer line, the pressure regulator 100 is also applicable for multiwalled transfer lines having three and more walls.

In the claims, the word "comprising" does not exclude other elements or steps, and the indefinite article "a" does not exclude a plurality.

A single unit or device may perform the functions of multiple elements recited in the claims. The fact that individual functions and elements are recited in different dependent claims does not mean that a combination of those functions and elements could not advantageously be used.

LIST OF REFERENCE SIGNS 100 pressure regulator
101 transfer line (upstream section)
102 Transfer line (downstream section)
103 Inner tube
104 Outer tube
106 Channel
107 Ring space
108 Main body
109 Passage
111 Valve chamber
112 Valve element
113 Outlet
114 Communication chamber
116 Passage
117 Recess
118 Membrane
119 Actuation rod
121 Double arrow
122 Spring
123 Housing
124 Interior space

The invention claimed is:

1. A pressure regulator for fluids, wherein the pressure regulator comprises:
a main body including a control valve actuated by a control element responding to a pressure signal generated by sensor means to maintain a set pressure in a transfer line,
wherein the main body, the control valve, the control element and the sensor means are contained in an interior space enclosed by a housing, and
wherein the transfer line is a multiwalled transfer line, wherein the housing is connected with an outer tube of the multiwalled transfer line such that a space enclosed between the outer tube and an inner tube of the multiwalled transfer line is fluidly connected with the interior space of the housing such that a pressure below atmospheric pressure prevails in the interior space.

2. The pressure regulator according to claim 1, wherein the interior space and the ring space are evacuated.

3. The pressure regulator according to claim 1, wherein the pressure regulator is enclosed in a gas-tight envelope whose interior is filled with a gas whose boiling point is below the fluid temperature.

4. The pressure regulator according to claim 1, wherein the pressure regulator is installed between an upstream section and a downstream section of the transfer line.

5. The pressure regulator according to claim 1, wherein the sensor means is a membrane.

6. The pressure regulator according to claim 5, wherein the sensor means further comprise a spring exerting a spring force on the membrane, wherein the spring is contained in the housing of the pressure regulator.

7. The pressure regulator according to claim 6, wherein the pressure regulator is provided with a pressure means, which exerts adjustable forces on the spring so that different set pressures of the pressure regulator can be selected.

* * * * *